United States Patent
Kimata

(10) Patent No.: US 8,457,224 B2
(45) Date of Patent: Jun. 4, 2013

(54) APPARATUS FOR CHANNEL ESTIMATION, APPARATUS FOR EQUALIZATION AND METHOD FOR EQUALIZATION

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 12/449,402

(22) PCT Filed: Feb. 6, 2008

(86) PCT No.: PCT/JP2008/051953
§ 371 (c)(1),
(2), (4) Date: Aug. 6, 2009

(87) PCT Pub. No.: WO2008/099734
PCT Pub. Date: Aug. 21, 2008

(65) Prior Publication Data
US 2011/0007792 A1    Jan. 13, 2011

(30) Foreign Application Priority Data
Feb. 7, 2007 (JP) ................ 2007-027435

(51) Int. Cl.
*H04K 1/10* (2006.01)
*H04L 27/28* (2006.01)

(52) U.S. Cl.
USPC ........... 375/260; 375/229; 375/316; 375/346; 375/348; 375/285; 327/310; 327/384; 327/551; 348/607; 455/296

(58) Field of Classification Search
None
See application file for complete search history.

(56) References Cited

U.S. PATENT DOCUMENTS
2002/0172147 A1* 11/2002 Matsumoto .................. 370/208
2006/0280114 A1* 12/2006 Osseiran et al. ............. 370/208
(Continued)

FOREIGN PATENT DOCUMENTS
JP    2003-101503    4/2003
JP    2005-223698    8/2005

OTHER PUBLICATIONS

D. Falconer, et al., "Frequency Domain Equalization for Single-Carrier Broadband Wireless Systems", IEEE Commun. Mag., vol. 40, No. 4, pp. 58-56, Apr. 2002.
Kimata, et al., "A Study of Frequency Domain Demodulation Scheme in Uplink Single-Carrier IFDMA", 2006 Shingaku Sodai, B-5-36.

*Primary Examiner* — Shuwang Liu
*Assistant Examiner* — Gina McKie
(74) *Attorney, Agent, or Firm* — McGinn IP Law Group, PLLC

(57) ABSTRACT

The present invention provides a channel estimation apparatus in which channel estimation may be made higher than heretofore in accuracy and may be used for calculating the weight for an equalization filter to achieve an optimum equalizing performance. A subcarrier copying unit 20 copies K items of end-side subcarriers, using the channel estimation obtained by a correlation processing unit 14 and K which is a subcarrier copy number. An IDFT unit 15 transforms the channel estimation obtained at the subcarrier copying unit 20 into the time domain channel response. A noise path removing unit 16 removes noise paths from the channel response output from the IDFT unit 15. A DFT unit 17 performs DFT of the channel response, from which the noise paths are removed by the noise path removing unit 16, to output a noise-suppressed frequency domain channel estimation value. A weight calculation unit 5 inputs the frequency domain channel estimation value output from the DFT unit 17 to calculate an equalizing weight.

24 Claims, 8 Drawing Sheets

U.S. PATENT DOCUMENTS

| | | | |
|---|---|---|---|
| 2007/0206689 A1* | 9/2007 | Koo et al. | 375/260 |
| 2009/0022239 A1* | 1/2009 | Kimura et al. | 375/267 |
| 2009/0190537 A1* | 7/2009 | Hwang et al. | 370/329 |
| 2011/0007792 A1* | 1/2011 | Kimata | 375/232 |

* cited by examiner

CHANNEL ESTIMATED VALUES ESTIMATED
BY CORRELATION PROCESSING UNIT 14

ENLARGED VIEW

NUMBER OF
SUBCARRIERS COPIED
K = 2

▲ ● CHANNEL ESTIMATED VALUES OBTAINED AT
    CORRELATION PROCESSING UNIT 14

○   HANNEL ESTIMATED VALUES WHICH ARE
    THOSE MARKED ▲ COPIED BY SUBCARRIER COPYING UNIT 20

APPARATUS FOR CHANNEL ESTIMATION, APPARATUS FOR EQUALIZATION AND METHOD FOR EQUALIZATION

TECHNICAL FIELD

1. Related Application

The present application claims priority rights based on Japanese Patent Application No. 2007-027435, filed in Japan on Feb. 7, 2007. The total disclosure of this Patent Application of the senior filing date is to be incorporated herein by reference.

This invention relates to an apparatus for channel estimation, an apparatus for equalization, a method for channel estimation and a method for equalization. More particularly, it relates to an apparatus for channel estimation, an apparatus for equalization, a method for channel estimation and a method for equalization, according to which a single carrier signal is transformed into a frequency domain signal to carry out channel estimation and the processing for equalization by signal processing in the frequency domain.

2. Background Art

In an uplink radio system of a next generation mobile communication, high efficiency of transmission power needs to be realized at a terminal side in order to achieve a wide coverage. To this end, a single carrier system, capable of suppressing the peak to average power ratio to a smaller value, is regarded to be promising. Further, for the next generation mobile communication, it is crucial to accomplish high speed data transmission. In high speed data transmission with the use of the single carrier signal, an inter-symbol interference, which is ascribable to a multipath, that is, a multipath interference, has become of a problem.

Among a variety of methods for suppressing the multipath interference, there is a method of using a linear equalizer as a simpler method. There has already been proposed a frequency equalizer that performs the equalization processing by signal processing in a frequency domain to allow for significant reduction of computational load (e.g., Non-Patent Document 1).

Since the frequency equalizer calculates equalizing weights, channel estimation in the frequency domain becomes necessary. There has thus been proposed a method of directly transforming a received pilot signal into a signal in the frequency domain and correlation of the pilot received signal with a pilot reference signal is taken in the frequency domain to perform channel estimation (e.g., Non-Patent Document 2).

FIG. 8 is a block diagram showing the configuration of a related art channel estimation apparatus and equalization apparatus as disclosed in Non-Patent Document 2. Referring to FIG. 8, the channel estimation apparatus and equalization apparatus include a CP (Cyclic Prefix) removing unit 51, a DFT (Discrete Fourier Transform) unit 52, a receiving filter 53, a channel estimation unit 54, a weight calculation unit 55, an equalization filter 56 and an IDFT (Inverse Discrete Fourier Transform) unit 57.

The CP removing unit 51 inputs a received signal to remove a signal portion of the received signal corresponding to CP. The DFT unit 52 inputs the received signals, from which CP is removed by the CP removing unit 51, to execute $N_{DFT}$ point DFT, where $N_{DFT}$ is an integer greater than or equal to 2, to output the received signal transformed into a frequency domain signal. The receiving filter 53 limits the bandwidth of the received signal in the frequency domain to effect waveform shaping and noise suppression. For the receiving filter 53, a raised cosine roll-off filter, inclusive of a roll-off rate equal to 0, is generally used.

In the configuration of FIG. 8, filtering of the received signal is made by signal processing in the frequency domain. Or, the filtering may be made by signal processing in the time domain at a location, ahead of the DFT unit 52. The channel estimation unit 54 performs channel estimation by correlation processing of a pilot received signal and a pilot reference signal in the frequency domain.

The channel estimation unit 54 includes: a subcarrier demapping unit 60, DFT units 61 and 67, a transmitting/receiving filter 62, a reference signal generating unit 63, a correlation processing unit 64, an IDFT unit 65 and a noise path removing unit 66.

The subcarrier demapping unit 60 inputs the pilot received signal, output from the receiving filter 53, and selects only the subcarrier of the pilot signal of a desired user to decimate unneeded subcarriers. The subcarrier demapping unit 60 may be placed ahead of the receiving filter 53 directly in rear of the DFT unit 52.

The DFT unit 61 performs DFT of a pilot symbol of the desired user to transform the pilot symbol into a frequency domain signal. The frequency domain signal of the pilot symbol is entered into the transmitting/receiving filter 62.

The reference signal generating unit 63 calculates the pilot reference signal, used for correlation processing with the pilot received signal, from the output of the transmitting/receiving filter 62. The reference signal generating unit 63 makes use of a ZF (Zero-Forcing) method that entirely cancels out symbol characteristics of the pilot received signal, a MMSE (Minimum Mean Square Error) method that suppresses noise increase in the correlation processing, or a clipping method.

With the use of the ZF method, the pilot reference signal $X(k)$ for the subcarrier k ($1 \leq k \leq N_{DFT}$) is given by $$X(k) = C(k)/|C(k)|^2 \tag{1}$$

where $C(k)$ indicates an output signal of the transmitting/receiving filter 62. The correlation processing unit 64 calculates the channel estimation value based on the processing of correlation of the received frequency domain pilot signal and the pilot reference signal. A channel estimation value $H(k)$ for a subcarrier k ($1 \leq k \leq N_{DFT}$) may be calculated by $$H(k) = X^*(k) P_{RX}(k) \tag{2}$$

where $P_{RX}(k)$ is a pilot received signal, bandwidth-limited by the receiving filter 53, and a suffix * indicates complex conjugate.

The IDFT unit 65 transforms the channel estimation values, estimated by the correlation processing unit 64, into the channel response in the time domain. The noise path removing unit 66 substitutes zeros ("0"s) for a signal having only noise points (noise path) to remove the noise signal (noise path) from the channel response which is an output of the IDFT unit 65. The noise path removing unit 66 uses a time window filter or noise threshold value control. The time window filter assumes that the channel response is within a CP width, and substitutes zeros (0s) for a signal with points other than a interval corresponding to the CP width as a noise path.

Noise threshold value control substitutes zeros ("0"s) for the signals of points less than or equal to a preset threshold value as being noise paths. If the time window filter and the noise threshold value control are used in conjunction, an average value of the noise outside the window of the time window filter may be used as a noise threshold value. The DFT unit 67 discrete Fourier transforms the channel response, from which the noise paths are removed by the noise path removing unit 66, to output noise-suppressed channel estimation values in the frequency domain.

The weight calculating unit 55 inputs the channel estimation values of the frequency domain, output from the channel estimation unit 54, to calculate equalizing weights. The weight calculating unit 55 generally uses am MMSE method or a ZF method. An MMSE weight W(k) ($1<=k<=N_{DFT}$) for a subcarrier k may be calculated, using the channel estimation value H(k), in accordance with the following equation:

$$W(k)=H(k)/(|H(k)|^2+\sigma^2) \quad (3)$$

where $\sigma^2$ indicates the noise power. The equalization filter 56 inputs the equalizing weights, calculated by the weight calculation unit 55, and the received signals, bandwidth-limited by the receiving filter 53, and multiplies them with each other from one subcarrier to another to equalize the received signals in the frequency domain. When it is assumed that the received data signal, bandwidth-limited by the receiving filter 53, is $D_{RX}(k)$ ($1<=k<=N_{DFT}$), and the equalizing weights, calculated by the weight calculation unit 55, is W(k), the signal Y(k) ($1<=k<=N_{DFT}$), equalized by the equalization filter 56, may be represented by the following equation:

$$Y(k)=X^*(k)D_{RX}(k) \quad (4)$$

The IDFT unit 57 inputs the equalized signal in the frequency domain, output from the equalization filter 56, and executes an $N_{IDFT}$ point IDFT, where $N_{IDFT}$ is an integer greater than or equal to 2, to transform the signal into time domain signal, which will be output as a demodulated signal.

An example of this sort of another channel estimation apparatus or equalizer apparatus is disclosed in Patent Document 1.

[Patent Document 1] JP Patent Kokai Publication No. JP-P2005-223698A

[Non-Patent Document 1] D. Falconer, S. L. Ariyavisitakul, A. Benyamin-Seeyar, and B. Eidson, "Frequency Domain Equalization for Single-Carrier Broadband Wireless Systems," IEEE Commun. Mag., vol. 40, no. 4, pp. 58-66, April 2002

[Non-Patent Document 2] Kimata and Yoshida, "A Study of Frequency Domain Demodulation Scheme in Uplink Single-Carrier IFDMA", 2006 Shingaku Sodai, B-5-36

SUMMARY

The entire disclosures of the above-described Patent Document 1 and the Non-Patent Documents 1 and 2 are incorporated by reference herein. The following is an analysis of the related techniques by the present invention.

The channel estimation apparatus and equalizing apparatus of the related art suffer from the following problem: The channel response, from which noise path is removed by the noise path removing unit 66 using the time window filter or noise threshold value control, is equivalent to the subcarrier mean weighted with SINC function of the coherent bandwidth, in the frequency domain. Thus, if a filter apparatus used in the receiving filter 53 or the transmitting/receiving filter 62 has a roll-off rate close to "0" or if a bandwidth of the received signal is a narrow, the amplitude level of the subcarrier at an end portion of a channel estimation value of the frequency domain obtained by the DFT unit 67 begins to decline. In this case, a channel estimation value obtained may not be accurate, thus leading to degradation in the equalization performance.

In Patent Document 1 or in Non-Patent Documents 1, 2, there are not disclosed means to combat this problem.

It is therefore an object of the present invention to provide an apparatus for channel estimation, an apparatus for equalization, a method for channel estimation and a method for equalization, whereby the channel estimation may be made higher in accuracy than heretofore and whereby the channel estimation may be used for calculating the weights for the equalization filter to achieve an optimum equalization performance.

According to the present invention which seeks to solve one or more of the problems, there is provided a channel estimation apparatus in which a channel estimation value is estimated by signal processing in the frequency domain using a single carrier pilot signal, comprising a means that copies one or a plurality of channel estimation values of end-side subcarriers before transforming the channel estimation values in the frequency domain into a time domain. According to the present invention, the copying means may copy one or more of the channel estimation values of each of end-side subcarriers at a corresponding location opposite to the end-side on the frequency axis with being spaced corresponding to the subcarrier frequency. That is, the copying means may copy one or a plurality of channel estimation values of the end-side subcarriers at a location of a subcarrier of a low frequency component and/or a high frequency component outside the bandwidth of said received signal.

The present invention also provides an equalizing apparatus in which a single carrier signal is transformed into a frequency domain signal and processed for equalization by signal processing in the frequency domain. The equalizing apparatus comprises: a copying means that copies one or a plurality of channel estimation values of end-side subcarriers before transforming the channel estimation values in the frequency domain into a time domain, and an equalizing means that equalizes a received signal based on channel estimation values copied by the copying means.

The present invention also provides a channel estimation method in which a channel estimation value is estimated by signal processing in the frequency domain using a single carrier pilot signal. The channel estimation method comprises:

a copying step of copying one or a plurality of channel estimation values of an end-side subcarriers before transforming the channel estimation values in the frequency domain into a time domain.

The present invention also provides an equalizing method in which a single carrier signal is transformed into a frequency domain signal and processed for equalization by signal processing in the frequency domain. The equalizing method comprises a copying step of copying one or a plurality of channel estimation values of an end-side subcarriers before transforming the channel estimation values in the frequency domain into a time domain, and an equalization filtering step of equalizing a received signal based on the channel estimation values copied by the copying step.

The present invention also provides a program for a channel estimation method in which a channel estimation value is estimated by signal processing in the frequency domain using a single carrier pilot signal. The program allows a computer to execute:

a copying step of copying one or a plurality of channel estimation values of an end-side subcarriers before transforming the channel estimation values in the frequency domain into a time domain. The present invention provided a computer-readable recording medium that stores the above mentioned program.

The present invention also provides another program for an equalizing method in which a single carrier signal is transformed into a frequency domain signal and processed for equalization by signal processing in the frequency domain. The program allows a computer to execute which a single carrier signal is transformed into a frequency domain signal and processed for equalization by signal processing in the frequency domain. The equalizing method comprises a copying step of copying one or a plurality of channel estimation values of an end-side subcarriers before transforming the channel estimation values in the frequency domain into a time domain, and an equalization filtering step of equalizing a received signal based on the channel estimation values copied by the copying step.

The present invention also provides a program for a channel estimation method in which a channel estimation value is estimated by signal processing in the frequency domain using a single carrier pilot signal. The program allows a computer to execute:

a copying step of copying one or a plurality of channel estimation values of an end-side subcarriers before transforming the channel estimation values in the frequency domain into a time domain. The present invention provides a computer-readable recording medium that stores the above mentioned program.

The present invention also provides another program for an equalizing method in which a single carrier signal is transformed into a frequency domain signal and processed for equalization by signal processing in the frequency domain. The program allows a computer to execute a copying step of copying one or a plurality of channel estimation values of end-side subcarriers before transforming the channel estimation values in the frequency domain into a time domain, and an equalization filtering step of equalizing a received signal based on the channel estimation values copied by the copying step. The present invention provides a computer-readable recording medium that stores the above mentioned program.

The present invention also provides another channel estimation apparatus in which a channel estimation value is estimated by signal processing in the frequency domain using a single carrier pilot signal. The channel estimation apparatus comprises:

a first DFT (Discrete Fourier Transform) unit that receives the pilot received signal to transform the signal into the frequency domain, a subcarrier demapping unit that selects only one or more desired subcarriers, a correlation processing unit that performs channel estimation by processing of correlation of an output of the subcarrier demapping unit and a pilot reference signal generated on transferring a pilot symbol into the frequency domain, a subcarrier copying unit that copies K items of end-side subcarriers, using channel estimation obtained in the correlation processing unit and K which is a subcarrier copy number, where K is an integer greater than or equal to zero (0), a first IDFT (Inverse Discrete Fourier Transform) unit that transforms channel estimation obtained by the subcarrier copying unit into time domain channel response, a noise path removing unit that removes noise paths from the channel response, and a second DFT unit that transforms the channel response, from which noise paths are removed by the noise path removing unit, to the frequency domain, to output a noise-suppressed channel estimation value.

The present invention also provides another equalizing apparatus in which a single carrier signal is transformed into a frequency domain signal and equalized by signal processing in the frequency domain. The equalizing apparatus comprises a first DFT unit that receives the single carrier pilot signal to transform the signal into the frequency domain, a subcarrier demapping unit that selects only one or more desired subcarriers, a correlation processing unit that performs channel estimation by processing of correlation of an output of the subcarrier demapping unit and a pilot reference signal generated on transferring a pilot symbol into the frequency domain, a subcarrier copying unit that copies K items of end-side subcarriers, using channel estimation obtained in the correlation processing unit and K which is a subcarrier copy number, where K is an integer greater than or equal to zero (0), a first IDFT unit that transforms channel estimation obtained by the subcarrier copying unit into time domain channel response, a noise path removing unit that removes noise paths from the channel response, a second DFT unit that transforms the channel response, from which noise paths are removed by the noise path removing unit, to the frequency domain, to output a noise-suppressed channel estimation value, a weight calculation unit that calculates equalizing weights from the noise-suppressed channel estimation obtained by the second DFT unit, an equalization filter that equalizes a received signal in the frequency domain by the equalizing weights, and a second IDFT unit that transforms the equalized signal into the time domain to output a resulting demodulated signal.

The present invention also provides another channel estimation apparatus in which a channel estimation value is estimated by signal processing in the frequency domain using a single carrier pilot signal. The channel estimation apparatus comprises a first DFT unit that receives a pilot received signal to transform the signal into the frequency domain, a subcarrier demapping unit that selects only one or more desired subcarriers, a correlation processing unit that performs channel estimation by processing of correlation of an output of the subcarrier demapping unit and a pilot reference signal generated on transferring a pilot symbol into the frequency domain, a third IDFT unit that transforms channel estimation obtained by the correlation processing unit into time domain channel response, a transmission path calculation unit that calculates a coherent bandwidth from the channel response, a subcarrier copying unit that determines the number for copying in accordance with a transmission path state using channel estimation obtained by the correlation processing unit, the coherent bandwidth calculated by the transmission path calculation unit K which is a subcarrier copy number and that copies a number of end-side subcarriers thus determined, a first IDFT unit that transforms the channel estimation obtained by the subcarrier copying unit into the time domain channel response, a noise path removing unit that removes one or more noise paths from the channel response, and a second DFT unit that transforms the channel response, from which noise paths are removed by the noise path removing unit, to the frequency domain to output a noise-suppressed channel estimation value.

The present invention also provides another equalizing apparatus in which a single carrier signal is transformed into a frequency domain signal and processed for equalization by signal processing in the frequency domain. The equalizer apparatus comprises a first DFT unit that receives the single carrier pilot signal to transform the signal into the frequency domain, a subcarrier demapping unit that selects only one or more desired subcarriers, a correlation processing unit that performs channel estimation by processing of correlation of an output of the subcarrier demapping unit and a pilot reference signal generated on transferring a pilot symbol into a frequency domain signal, a third IDFT unit that transforms channel estimation obtained by the correlation processing unit into time domain channel response, a transmission path calculation unit that calculates a coherent bandwidth from the channel response, a subcarrier copying unit that determines the number for copying in accordance with a transmission path state, using channel estimation obtained by the correlation processing unit, the coherent bandwidth calculated by the transmission path calculation unit and K which is a subcarrier copy number and that copies a number of end-side subcarriers thus determined, a first IDFT unit that transforms the channel estimation obtained by the subcarrier copying unit into time domain channel response, a noise path removing unit that removes one or more noise paths from the channel response, a second DFT unit that transforms the channel response, from which noise paths are removed by the noise path removing unit, to the frequency domain to output a noise-suppressed channel estimation value, a weight calculation unit that calculates an equalizing weight from the noise-suppressed channel estimation obtained by the second DFT unit, an equalization filter that equalizes a received signal in the frequency domain by the equalizing weight, and a second IDFT unit that transforms the equalized signal to the time domain to output a resulting demodulated signal.

The present invention also provides another channel estimation method in which a channel estimation value is estimated by signal processing in the frequency domain using a single carrier pilot signal. The channel estimation method comprises:

receiving a pilot received signal and transforming the pilot received signal to the frequency domain;

selecting a desired subcarrier;

performing channel estimation by correlation processing of selected subcarrier and a pilot reference signal obtained on transferring a pilot symbol into the frequency domain;

using the channel estimation and K which is a subcarrier copy number, copying K items of end-side subcarriers;

transforming resulting channel estimation into time domain channel response;

removing one or more noise-paths from the channel response;

transforming the channel response, from which noise paths are removed, is into the frequency domain; and outputting a noise-suppressed channel estimation value.

The present invention also provides another equalizing method in which a single carrier signal is transformed into a frequency domain signal and equalized by signal processing in the frequency domain. The equalizing method comprises:

receiving a pilot received signal and transforming the pilot received signal to the frequency domain;

selecting a desired subcarrier;

performing channel estimation by correlation processing of selected subcarrier and a pilot reference signal obtained on transferring a pilot symbol into the frequency domain;

using the channel estimation and K which is a subcarrier copy number, copying K items of end-side subcarriers;

transforming resulting channel estimation into time domain channel response;

removing one or more noise-paths from the channel response; and transforming the channel response, from which noise paths are removed, is into the frequency domain;

outputting a noise-suppressed channel estimation value;

calculating an equalizing weight from noise-suppressed channel estimation;

equalizing the received signal in the frequency domain with the equalizing weight; and transforming the equalized signal into a time domain and outputting a resulting demodulated signal.

The present invention also provides another channel estimation method in which a channel estimation value is estimated by signal processing in the frequency domain using a single carrier pilot signal. The channel estimation method comprises:

receiving a pilot received signal and transforming the pilot received signal to the frequency domain;

selecting a desired subcarrier;

performing channel estimation by correlation processing of a selected subcarrier and a pilot reference signal obtained on transferring a pilot symbol into the frequency domain;

transforming the channel estimation into time domain channel response;

calculating a coherent bandwidth from the channel response;

determining the number of subcarriers to be copied in accordance with a transmission path state, using the channel estimation, the coherent bandwidth and K which is a subcarrier copy number;

copying the number determined of end-side subcarriers;

transforming the resulting channel estimation into time domain channel response;

removing one or more noise paths from the channel response;

transforming the channel response, from which noise paths are removed into the frequency domain; and outputting a noise-suppressed channel estimation value.

The present invention also provides another equalizing method in which a single carrier signal is transformed into a frequency domain signal and equalized by signal processing in the frequency domain. The equalizing method comprises:

receiving a pilot received signal and transforming the pilot received signal to the frequency domain;

selecting a desired subcarrier;

performing channel estimation by correlation processing of a selected subcarrier and a pilot reference signal obtained on transferring a pilot symbol into the frequency domain;

transforming the channel estimation into time domain channel response;

calculating a coherent bandwidth from the channel response;

determining the number of subcarriers to be copied in accordance with a transmission path state, using the channel estimation, the coherent bandwidth and K which is a subcarrier copy number;

copying the number determined of end-side subcarriers;

transforming the resulting channel estimation into time domain channel response;

removing one or more noise paths from the channel response;

transforming the channel response, from which noise paths are removed into the frequency domain; and outputting a noise-suppressed channel estimation value;

calculating an equalizing weight from noise-suppressed channel estimation;

equalizing a received signal in the frequency domain with the equalizing weight; and transforming the equalized signal into the time domain and outputting a resulting demodulated signal.

The operation of the present invention is now explained. With the channel estimation apparatus and with the equalizing apparatus, according to the present invention, a single carrier signal is transformed into a frequency domain signal, and channel estimation and equalization are carried out by signal processing in the frequency domain. Before once transferring frequency domain channel estimation values to the time domain, channel estimation values of end-side subcarriers are copied to improve channel estimation accuracy. This channel estimation is used for calculating the weights for the equalization filter to achieve an optimum equalizing performance.

According to the present invention, described above, channel estimation is improved in accuracy. This channel estimation is used for calculating the weight of the equalization filter to achieve an optimum equalizing performance.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modification in various obvious respects, all without departing from the invention. Accordingly, the drawings and description are to be regarded as illustrative in nature, and not as restrictive.

PREFERRED MODES

In the following, certain Examples of the present invention are described with reference to the drawings.

[Exemplary Embodiment 1]

Figure 1:
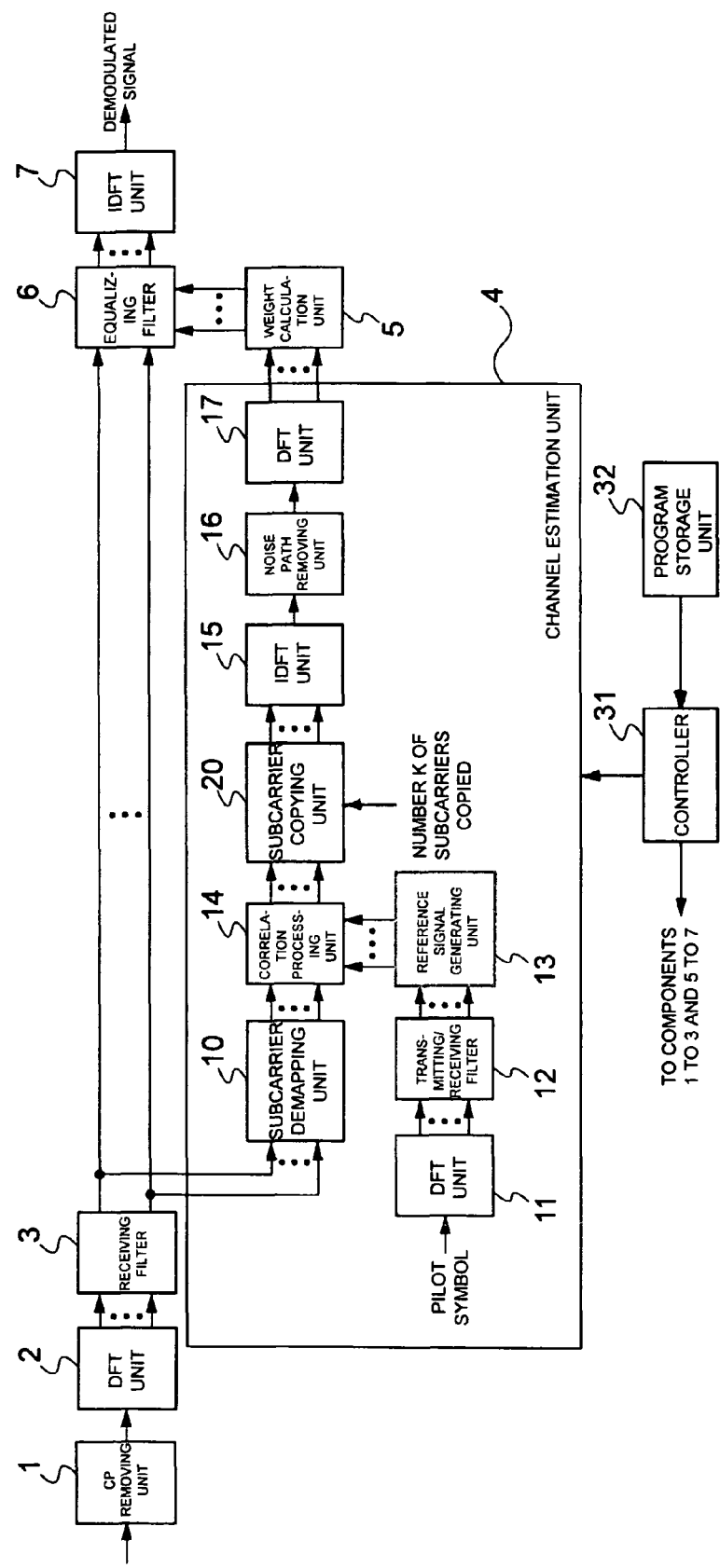
FIG. 1 is a block diagram showing Example 1 of a channel estimation apparatus and an equalizing apparatus according to the present invention.

FIG. 1 is a block diagram showing a first exemplary embodiment of the channel estimation apparatus and the equalizing apparatus according to the present invention. The first exemplary embodiment of the channel estimation apparatus and the equalizing apparatus includes a CP removing unit 1, a DFT unit 2, a receiving filter 3, a channel estimation unit 4, a weight calculation unit 5, an equalization filter 6, an IDFT unit 7, a controller 31, and a program storage unit 32.

The channel estimation unit 4 includes a subcarrier demapping unit 10, DFT units 11, 17, a transmitting/receiving filter 12, a reference signal generating unit 13, a correlation processing unit 14, an IDFT unit 15, a noise path removing unit 16 and a subcarrier copying unit 20.

The controller 31 controls the CP removing unit 1, DFT unit 2, receiving filter 3, channel estimation unit 4, weight calculation unit 5, equalization filter 6 and the IDFT unit 7.

In the program storage unit 32, there is stored a program for allowing a computer (controller 31) to execute the method for channel estimation and equalization according to the present invention.

That is, the controller 31 reads the program for the method of channel estimation and equalization from the program storage unit 32, and controls the respective components based on the program.

The operation of the first exemplary embodiment will now be described in detail with reference to FIGS. 2 and 3 that depict a flowchart for illustrating the method for channel estimation and equalization of the present the first exemplary embodiment.

Figure 2:
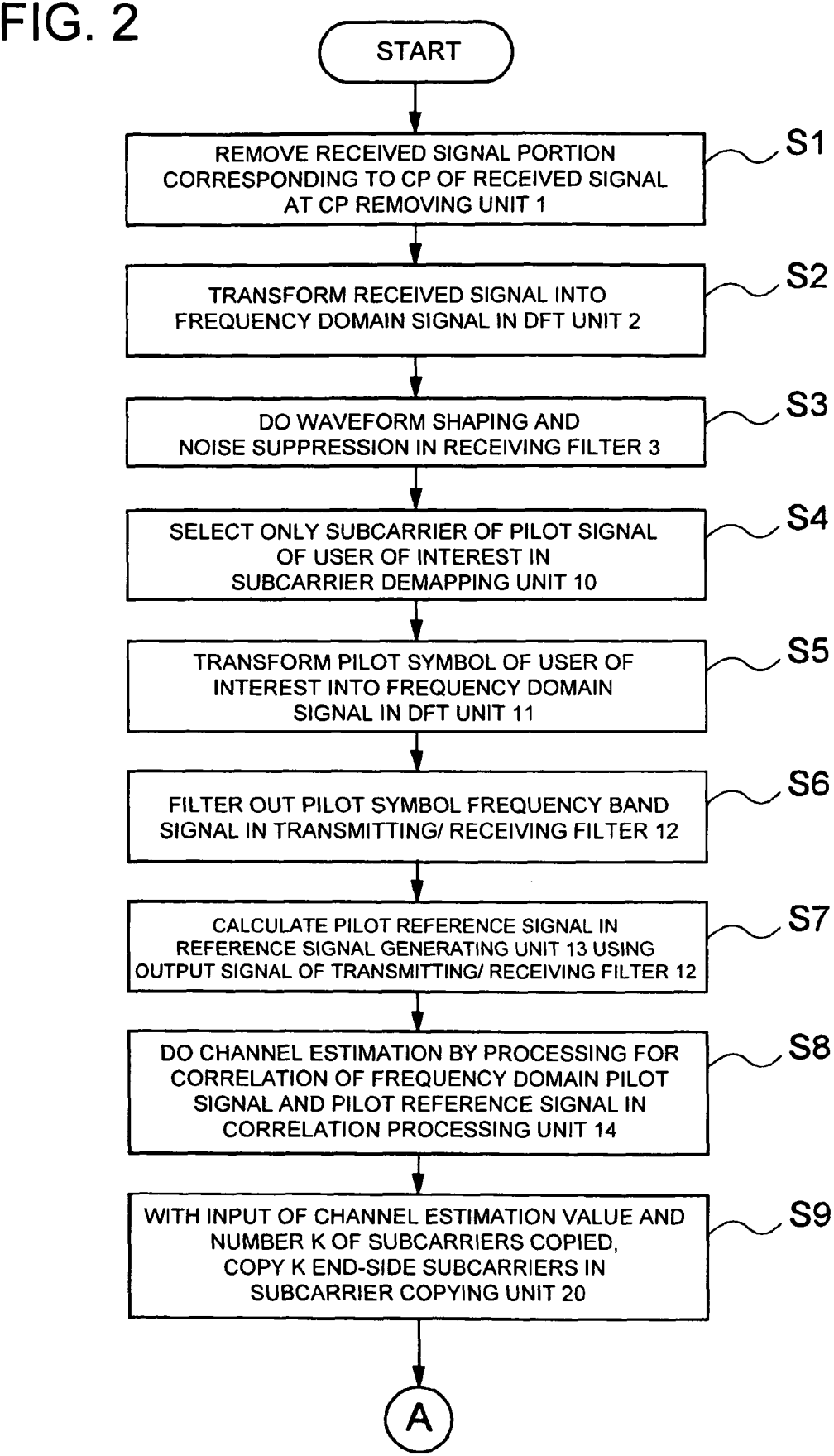
FIG. 2 is a flowchart for illustrating the method for channel estimation and for equalization of Example 1.

The CP removing unit 1 inputs a received signal to remove a signal portion of the received signal corresponding to CP (step S1 of FIG. 2). The DFT unit 2 inputs the received signal, from which the CP is removed by the CP removing unit 1, and performs $N_{DFT}$ point DFT, where $N_{DFT}$ is an integer greater than or equal to 2, to output the received signal transformed into a frequency domain signal (step S2 of FIG. 2). The receiving filter 3 performs bandwidth limitation on the received signal in the frequency domain to effect waveform shaping and noise suppression (step S3 of FIG. 2).

For the receiving filter 3, a raised cosine roll-off filter, including that with the roll-off rate of 1, is routinely used. In the configuration of FIG. 1, the received signals are filtered by signal processing in the frequency domain. It is however possible to do the filtering by signal processing in the time domain ahead of the DFT unit 2.

The channel estimation unit 4 estimates a channel estimation value by frequency domain signal processing of correlation of the pilot received signal and the pilot reference signal. The operation of the channel estimation unit 4 is now described.

The subcarrier demapping unit 10 inputs the pilot received signal, which is an output of the receiving filter 3, and selects only the subcarrier of the pilot signal of the desired user (step S4 of FIG. 2) to decimate unneeded subcarriers. It is observed that the subcarrier demapping unit 10 may be provided directly in rear of the DFT unit 2 ahead of the receiving filter 3.

The DFT unit 11 performs DFT of the pilot symbol of the desired user to transform the pilot symbol into a frequency domain signal (step S5 of FIG. 2). The frequency domain signal of the pilot symbol is passed through a transmitting/receiving filter apparatus of the transmitting/receiving filter 12 (step S6 of FIG. 2). The reference signal generating unit 13 calculates the pilot reference signal, used for processing for correlation with the pilot received signal, using an output of the transmitting/receiving filter 12 (step S7 of FIG. 2).

The reference signal generating unit 13 uses the ZF method that fully cancels out a code characteristic of the pilot received signal, the MMSE method that suppresses noise increase in the processing for correlation, or the clipping method. The pilot reference signal for the case of using the ZF method is represented by the equation (1).

The correlation processing unit 14 estimates the channel estimation value by processing for correlation of the frequency domain pilot received signal and the pilot reference signal (step S8 of FIG. 2). The channel estimation value is calculated by the equation (2).

The subcarrier copying unit 20 inputs the channel estimation value, estimated by the correlation processing unit 14, and the number K of copied subcarriers, where K is an integer greater than or equal to 0. The subcarrier copying unit 20 copies K items of end-side subcarriers (step S9 of FIG. 2). The IDFT unit 15 transforms the channel estimation value, obtained by the subcarrier copying unit 20, into time domain channel response (step S10 of FIG. 3).

Figure 3:
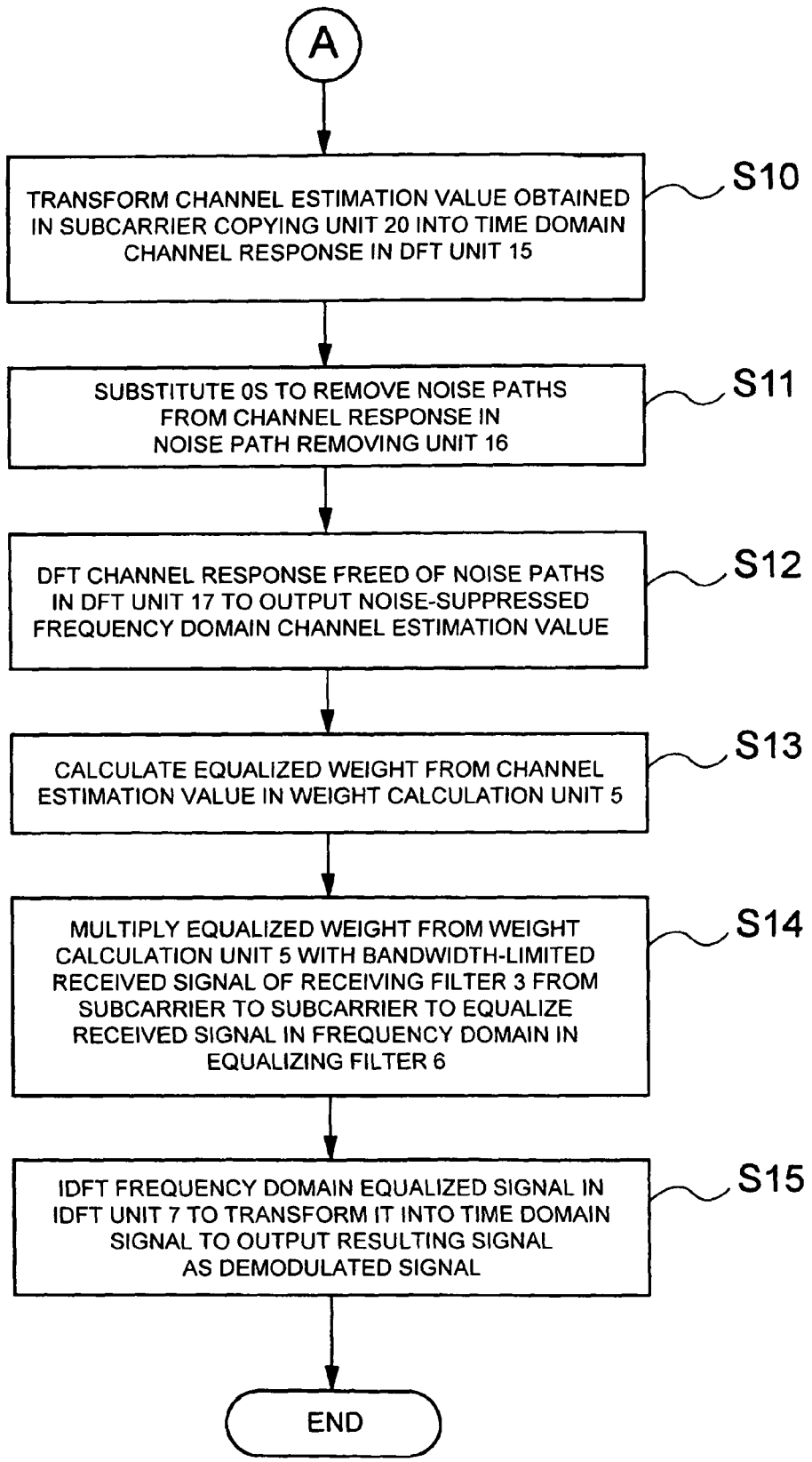
FIG. 3 is a flowchart, continuing to FIG. 2, for illustrating the method for channel estimation and for equalization of Example 1.

The noise path removing unit 16 substitutes zeros ("0"s) for a signal including only noise points (noise path) to remove the noise-only point signal from the channel response output from the IDFT unit 15 (step S11 of FIG. 3).

The noise path removing unit 16 uses time window filtering or noise threshold value control. The time window filter presumes that the channel response is comprised within the CP width, and substitutes zeros ("0"s) for the signal of points other than the interval corresponding to the CP width as being a noise path. Noise threshold value control substitutes zeros (0s) for the signal of points less than or equal to a preset threshold value as being a noise path. If time window filtering and noise threshold value control are used in conjunction, an average value of the noise outside the window of the time window filter may be used as the noise threshold value.

The DFT unit 17 performs DFT of the channel response, from which the noise paths are removed by the noise path removing unit 16, to output noise-suppressed channel estimation values of the frequency domain (step S12 of FIG. 3).

Figure 4A:
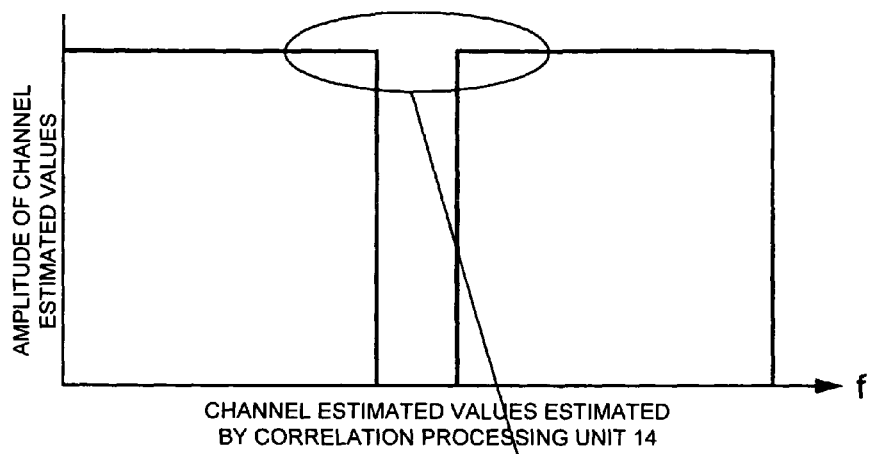
FIGS. 4A and 4B are schematic views for illustrating how channel estimation values are copied in a subcarrier copying unit.
Figure 4B:
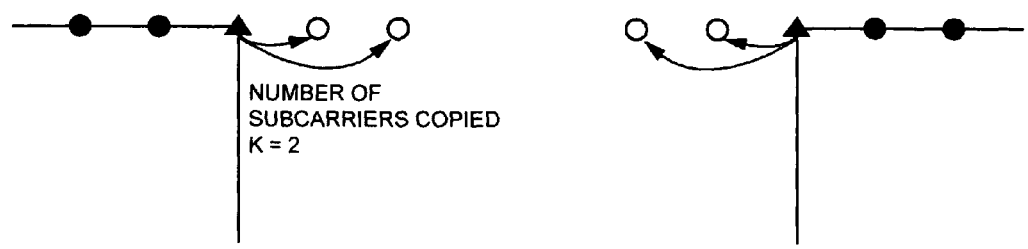

FIGS. 4A and 4B are schematic diagrams illustrating how channel estimation values are copied by the subcarrier copying unit 20. Specifically, FIG. 4A shows channel estimation value obtained by the correlation processing unit 14. FIG. 4B shows its enlarged view. These figures show the case of the number of copied subcarriers=2.

The channel estimation values of subcarriers at the end side estimated by the correlation processing unit 14 are denoted by triangular marks, while copied channel estimation values are denoted by blank circle marks. Two each of channel estimation values of both end side subcarriers indicated by the triangular marks are copied in subcarriers denoted by blank circle marks.

Figure 5:
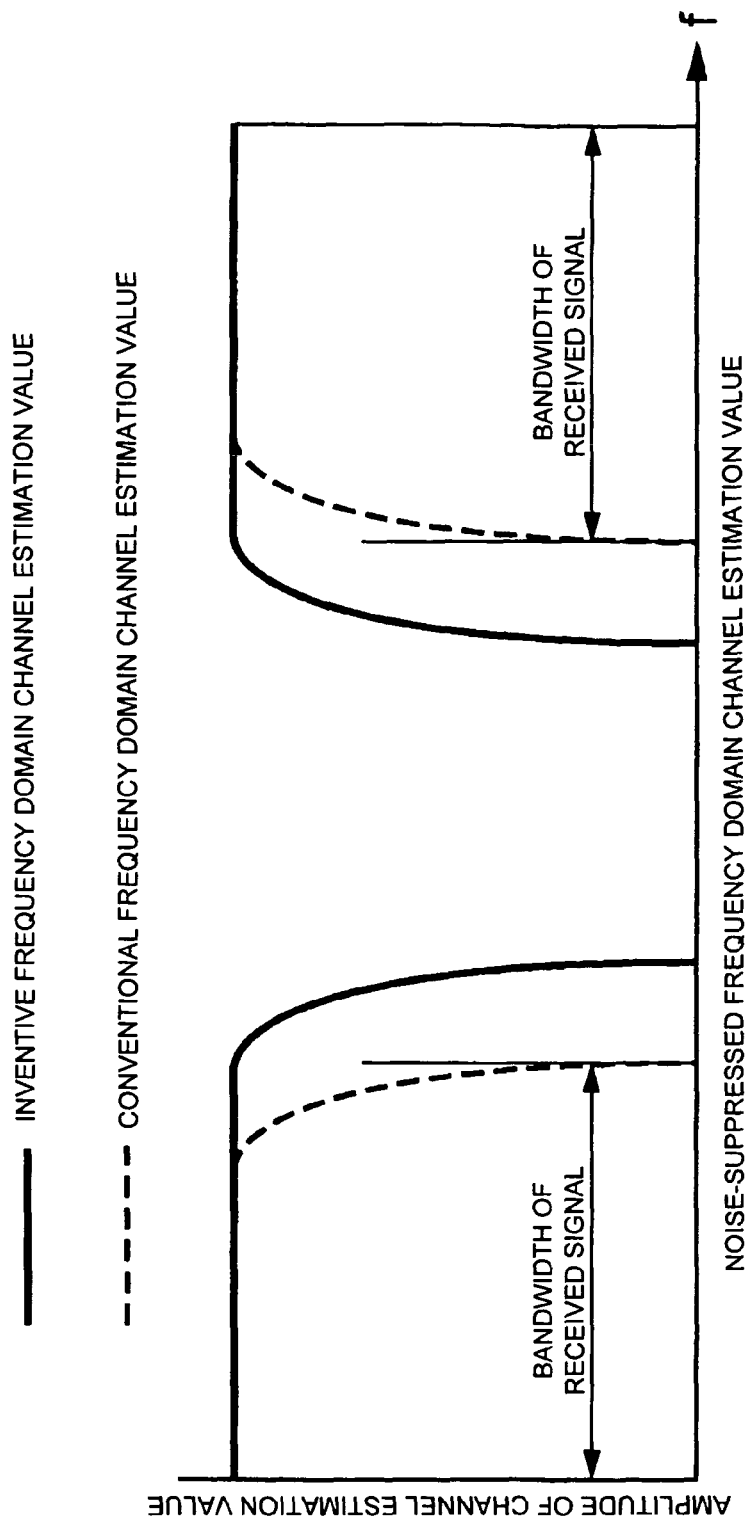
FIG. 5 is a schematic view for illustrating the states of noise-suppressed frequency domain channel estimation values for an inventive example and for an example of the related technique.

FIG. 5 is a schematic view showing the state of the noise-suppressed frequency domain channel estimation values according to the present invention and that of the conventional technique. Specifically, solid lines indicate the channel estimation values in the frequency domain according to the present invention and broken lines indicate those according to the related art technique. It is observed that the waveforms of FIG. 5 are output waveforms of the DFT units 17.

By copying the end side subcarriers, it is possible to prevent decline of the amplitude level of the subcarrier at the end sides of the frequency domain channel estimation values within the bandwidth of the received signal. It is observed that the location of a vertical line segment that demarcates the boundary of the "bandwidth of the received signal" corresponds to the location of the subcarrier at the end side (triangular mark) indicated in FIG. 4B.

Returning to the flowchart of FIG. 3, the weight calculation unit 5 inputs the frequency domain channel estimation value, output from the channel estimation unit 4, to calculate the equalizing weight (step S13 of FIG. 3). The weight calculation unit 5 in general uses the MMSE method or the zero forcing method. The MMSE weight may be calculated by the equation (3).

The equalization filter 6 inputs the equalizing weights calculated by the weight calculation unit 5 and the received signal bandwidth-limited by the receiving filter 3. The equalization filter multiplies the two by each other from one subcarrier to another to equalize the received signals in the frequency domain (step S14 of FIG. 3). The signal equalized by the equalization filter 6 is represented by the equation (4).

The IDFT unit 7 inputs a frequency domain equalized signal, output from the equalization filter 6, and performs $N_{IDFT}$ point IDFT, where $N_{IDFT}$ is an integer greater than or equal to 2, to transform the signal into a time domain signal, which is output as a demodulated signal (step S15 of FIG. 3).

With the first exemplary embodiment of the present invention, described above, in which frequency domain channel estimation values of end-side subcarriers are copied before transforming frequency domain channel estimation values into time domain signal, it is possible to improve channel estimation accuracy. By using the copied channel estimation values of the end-side subcarriers in calculating the weights for the equalization filter 6, it is possible to accomplish a high equalization performance.

EXAMPLE 2

Figure 6:
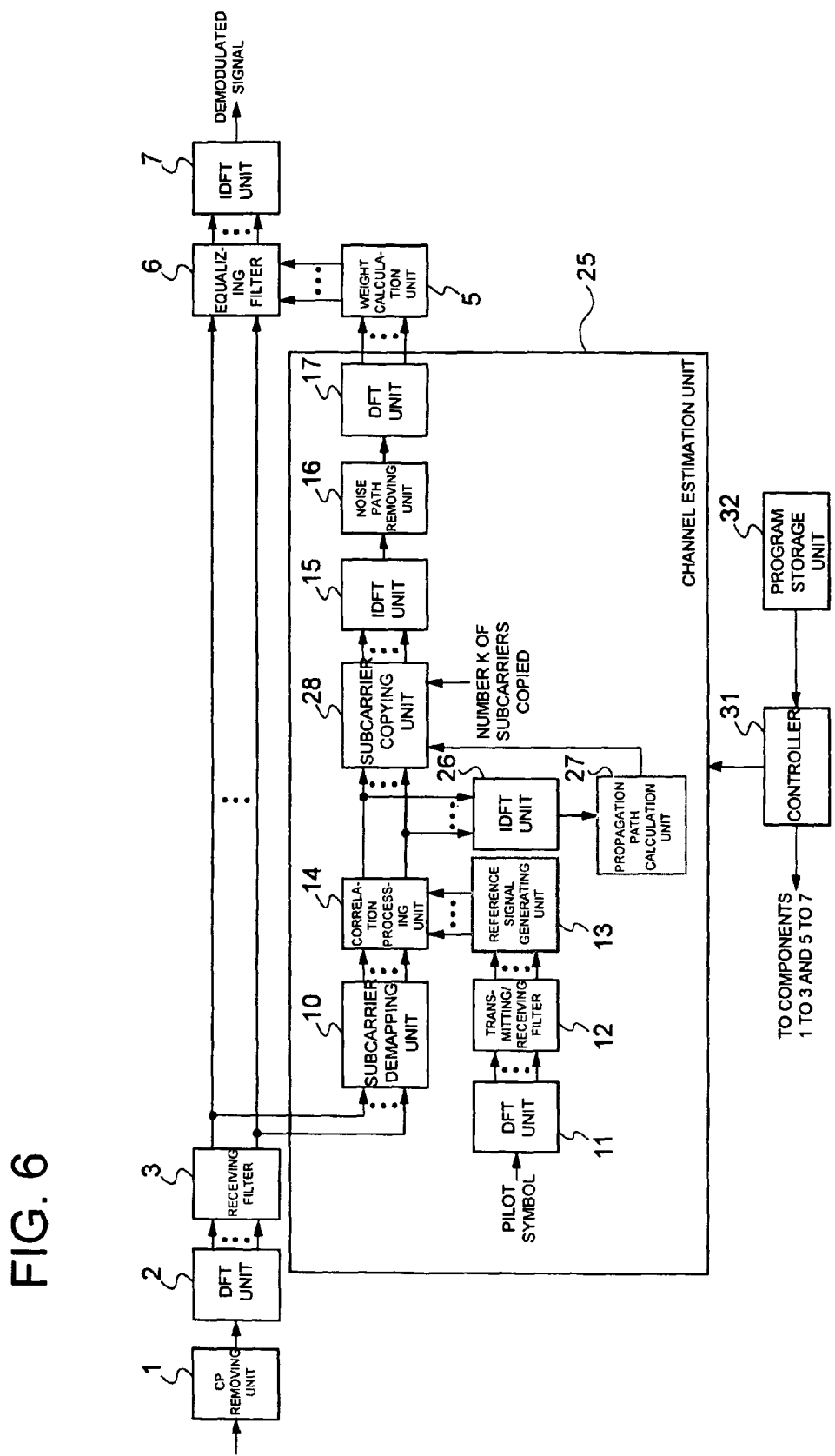
FIG. 6 is a block diagram showing a setup of Example 2 of the channel estimation apparatus and the equalizing apparatus according to the present invention.

FIG. 6 depicts a block diagram showing an Example 2 of the channel estimation apparatus and the equalizing apparatus according to the present invention. It is observed that, in FIG. 6, parts or components equivalent to those shown in FIG. 1 are denoted by the same reference numerals. The Example 2 of the channel estimation apparatus and the equalizing apparatus according to the present invention includes a CP removing unit 1, a DFT unit 2, a receiving filter 3, a channel estimation unit 25, a weight calculation unit 5, an equalization filter 6, an IDFT unit 7, a controller 31, and a program storage unit 32.

The channel estimation unit 25 includes a subcarrier demapping unit 10, DFT units 11, 17, a transmitting/receiving filter 12, a reference signal generating unit 13, a correlation processing unit 14, IDFT units 15, 26, a noise path removing unit 16, a transmission path calculation unit 27 and a subcarrier copying unit 28.

In Example 2, the operation of respective components of the channel estimation unit 25, excluding the IDFT unit 26, transmission path calculation unit 27 and the subcarrier copying unit 28, is the same as that of the first exemplary embodiment. It is observed that, in the first exemplary embodiment, the number of the end-side subcarriers to be copied is set to a fixed value of K. In the present Example 2, the number of the end-side subcarriers to be copied is set in accordance with a transmission path state.

The operation of Example 2 is now described with reference to FIG. 7 that shows a flowchart for illustrating essential portions of the method for channel estimation and for equalization according to the present Example 2.

Figure 7:
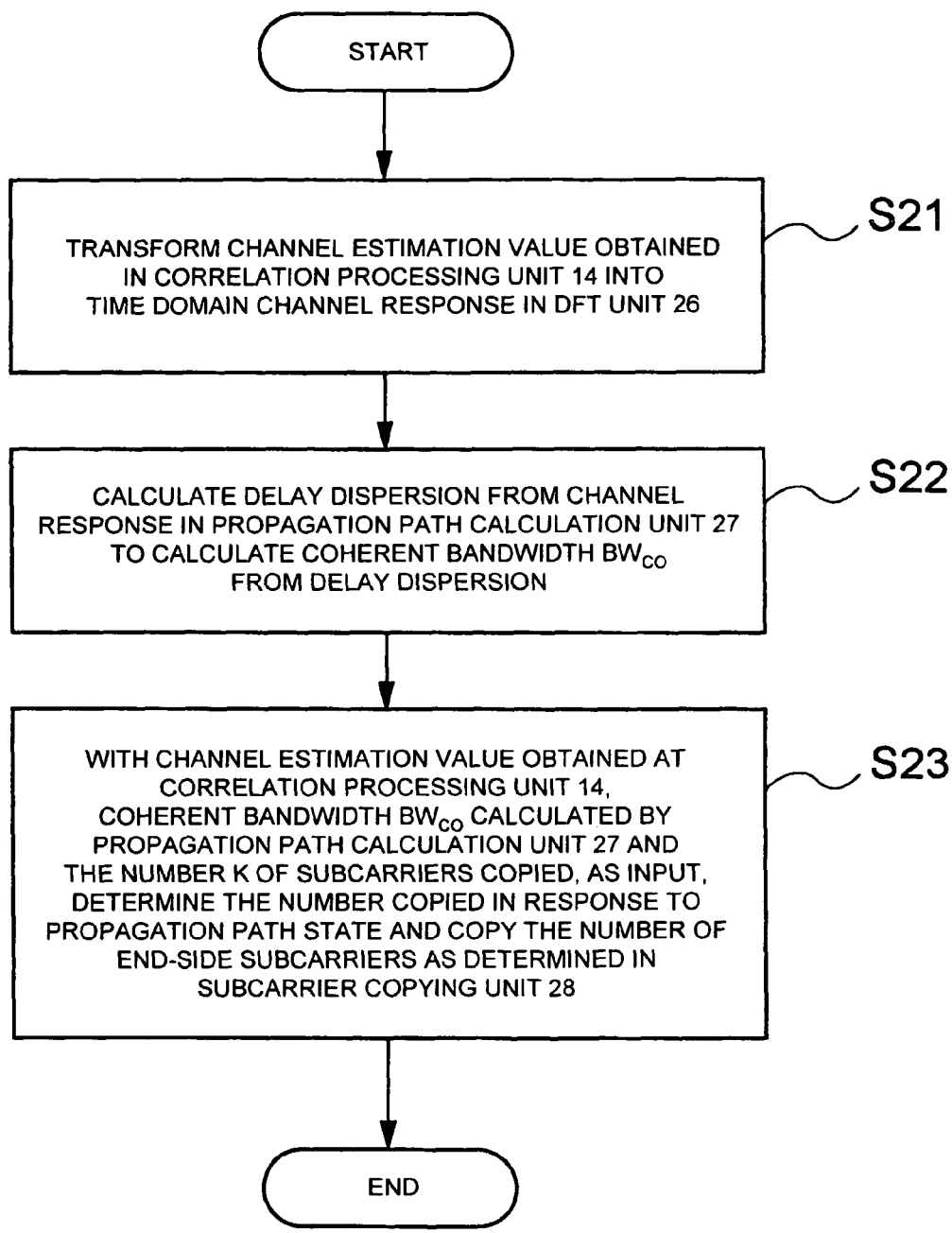
FIG. 7 is a flowchart showing essential parts of the method for channel estimation and for equalization of Example 2.
Figure 8:
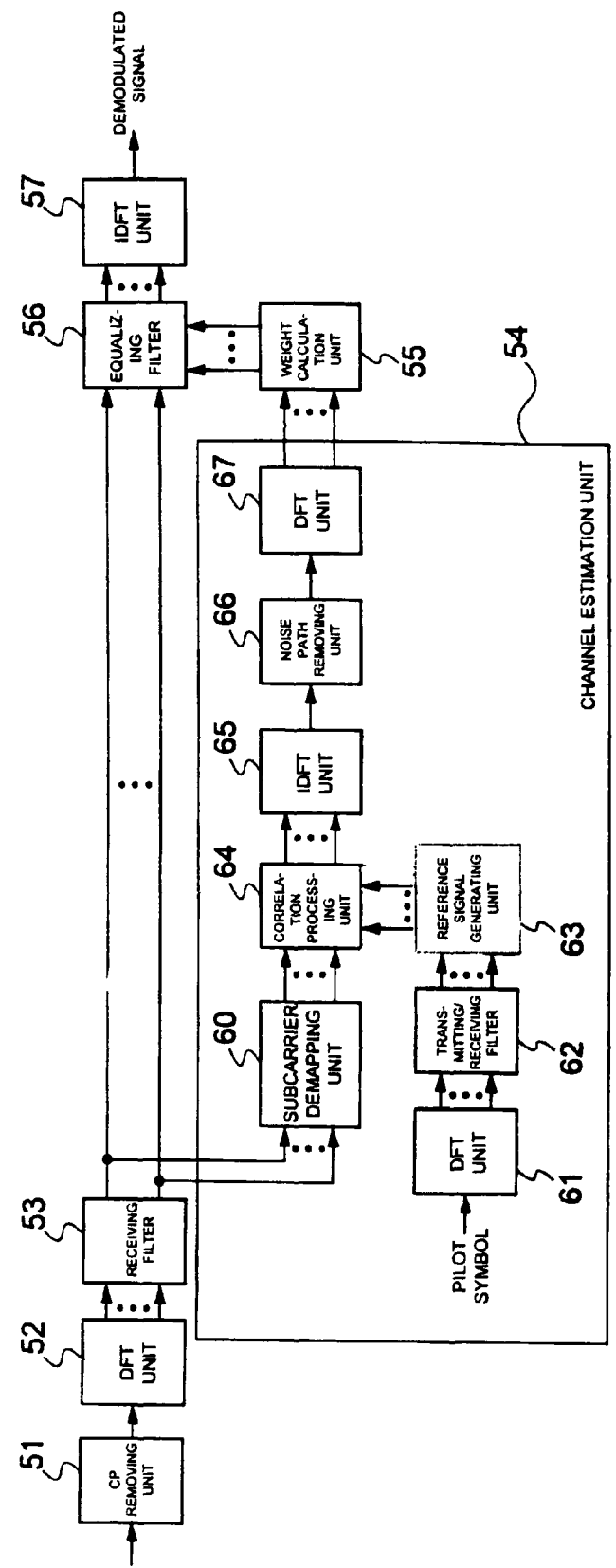
FIG. 8 is a block diagram showing an example of a conventional channel estimation apparatus and a conventional equalizing apparatus shown in Non-Patent Document 2.

The IDFT unit 26 transforms the channel estimation value, obtained by the correlation processing unit 14, into the time domain channel response (step S21 of FIG. 7).

The transmission path calculation unit 27 calculates the delay spread from the channel response as output from the IDFT unit 26, and calculates the coherent bandwidth $BW_{Co}$ from the calculated delay spread (step S22 of FIG. 7).

The subcarrier copying unit 28 inputs the channel estimation value, as obtained by the correlation processing unit 14, the coherent bandwidth $BW_{Co}$ as calculated by the transmission path calculation unit 27 and the number of copies K of the subcarriers, and determines the number of copies depending on a transmission path state. The subcarrier copying unit 28 accordingly copies the determined number of end-side subcarriers (step S23 of FIG. 7).

It is assumed that the bandwidth in case a K-number of subcarriers has been copied is $BW_{Copy}$. If the coherent bandwidth $BW_{Co}$ is greater than or equal to the bandwidth $BW_{Copy}$ which prevails in case the K-number of subcarriers has been copied ($BW_{Co} \geq BW_{Copy}$), the number of the end-side subcarriers to be copied is set so as to be equal to K or so as to be greater than K on the condition that the resulting bandwidth will be as close to the coherent bandwidth as possible.

If conversely the coherent bandwidth $BW_{Co}$ is less than the bandwidth $BW_{Copy}$ in case of having copied the K-number of the subcarriers ($BW_{Co} < BW_{Copy}$), the number of the copying of the end-side subcarriers is set so as to be equal to K or so as to be less than K on the condition that the resulting bandwidth will be as close to the coherent bandwidth as possible. The ensuing processing, that is, the processing of noise-suppressed frequency domain channel estimation, calculations of equalizing weights and the processing for equalization, are the same as that of the first exemplary embodiment, and hence the corresponding description is dispensed with.

With Example 2 of the present invention, described above, in which the channel estimation values of the end-side subcarriers are copied before transforming frequency domain channel estimation values into time domain signals, it is possible to improve channel estimation accuracy. By using the copied channel estimation values of the end-side subcarriers for calculating the weights for the equalization filter 6, it is possible to accomplish a high equalization performance. In addition, the present Example 2 includes a configuration of determining the number of copies of the end-side subcarriers in accordance with a transmission path state, channel estimation accuracy and equalizing performance higher than those of the first exemplary embodiment may be achieved with the present Example 2.

EXAMPLE 3

Example 3 is relevant to a program for use in the channel estimation method and in the equalizing method. The channel estimation apparatus and the equalizing apparatus according to the present invention include the controller 31 and the program storage unit 32, as set forth above (see FIGS. 1 and 6).

In the program storage unit 32, there is stored a program for allowing the computer (controller 31) to execute the method for channel estimation and for equalization according to the present invention.

That is, the controller 31 reads out the program for the method of channel estimation and equalization, indicated in FIGS. 2, 3 and 7, from the program storage unit 32, and controls the respective components based on that program. The control contents have already been described above and hence the description is dispensed with.

With Example 3 of the present invention, described above, in which the channel estimation values of the end-side subcarriers are copied before transforming frequency domain channel estimation values into time domain signals, it is possible to improve channel estimation accuracy. By using the copied channel estimation values of the end-side subcarriers for calculating the weights for the equalization filter 6, it is possible to accomplish a high equalization performance.

In the Examples 1 and 2, transform from time domain signals into frequency domain signals is by DFT, while that from frequency domain signals into time domain signals is by IDFT. It is however also possible to use FFT (Fast Fourier Transform), IFFT (Inverse Fast Fourier Transform) or other signal transform algorithms.

Industrial Applicability

The present invention may be applied to both the wireless apparatus of the base and mobile stations of the mobile communication system.

The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims.

The invention claimed is:

1. A channel estimation apparatus comprising:
    a unit that performs channel estimation by signal processing in a frequency domain using a single carrier pilot signal; and
    a copying unit that copies one or a plurality of channel estimation values of end-side subcarriers in the frequency domain before transforming the channel estimation values in the frequency domain to a time domain, wherein the copying unit copies said one or a plurality of channel estimation values of the end-side subcarriers at locations of subcarriers of low frequency components and/or high frequency components outside a bandwidth of the received signal,
    a unit that transforms the channel estimation values in the frequency domain obtained by the copying unit into the time domain;
    a unit that substitutes zeros (0s) for a noise path that is a signal having only noise points, using a time window filter or noise threshold value control for the channel estimation values transformed into the time domain to remove one or more noise paths from a channel response; and
    a unit that transforms the channel estimation values in the time domain from which ore. or more noise paths is removed, into the frequency domain to obtain channel estimation values in the frequency domain.

2. The channel estimation apparatus according to claim 1, wherein the copying unit determines a number of the end-side subcarriers to be copied in accordance with a transmission path state.

3. An equalizing apparatus comprising:
    a unit that transforms a single carrier signal into a frequency domain signal and performs equalization by signal processing in the frequency domain;
    a copying unit that copies one or a plurality of channel estimation values of end-side subcarriers in the frequency domain before transforming the channel estimation values in the frequency domain into a time domain, the copying unit copying said one or a plurality of channel estimation values of the end-side subcarriers at locations of subcarriers of low frequency components and/or high frequency components outside a bandwidth of the received signal;
    an IDFT (Inverse Discrete Fourier Transform) unit that transforms the channel estimation values in the frequency domain obtained by the copying unit into the time domain;

a noise path removing unit that substitutes zeros (0s) for a noise path that is a signal having only noise points, using a time window filter or noise threshold value control for the channel estimation values transformed into the time domain to remove one or more noise path from a channel response;

a DFT (Discrete Fourier Transform) unit that transforms the channel estimation values in the time domain, from which one or more noise paths are removed into the frequency domain; and an equalization filtering unit that performs equalization of a received signal based on the channel estimation values produced by the DFT unit.

4. The equalizing apparatus according to claim 3, wherein, the copying unit determines a number of the end-side subcarriers to be copied in accordance with a transmission path state.

5. The equalizing apparatus according to claim 3, wherein the copying unit copies one or a plurality of channel estimation values of the end-side subcarriers at locations of subcarriers of low frequency components and/or high frequency components outside a bandwidth of a received signal.

6. A channel estimation method comprising:

performing channel estimation by signal processing in a frequency domain using a single carrier pilot signal;

copying one or a plurality of channel estimation values of end-side subcarriers in a frequency domain before transforming the channel estimation values in the frequency domain into a time domain, wherein the copying step copies said one or a plurality of channel estimation values of the end-side subcarriers at locations of subcarriers of low frequency components and/or high frequency components outside a bandwidth of the received signal;

transforming the channel estimation values in the frequency domain obtained by the copying step into the time domain;

substituting zeros (0s) for a noise path that is a signal having only noise points, using a time window filter or noise threshold value control for the channel estimation values transformed into the time domain to remove one or more noise path from a channel response; and transforming the channel estimation values in the time domain, from which one or more noise paths are removed, into the frequency domain to obtain channel estimation values in the frequency domain.

7. The channel estimation method according to claim 6, wherein the copying step determines a number of the end-side subcarriers to be copied in accordance with a transmission path state.

8. An equalizing method comprising:

transforming a single carrier signal into a frequency domain signal and performing equalization by signal processing in the frequency domain, the method further comprising:

a copying step that copies one or a plurality of channel estimation values of end-side subcarriers in the frequency domain before transforming the channel estimation values in the frequency domain into a time domain, the copying step copying said one or a plurality of channel estimation values of the end-side subcarriers at locations of subcarriers of low frequency components and/or high frequency components outside a bandwidth of the received signal;

an IDFT (Inverse Discrete Fourier Transform) step that transforms the channel estimation values in the frequency domain obtained by the copying step into the time domain;

a noise path removing step that substitutes zeros (0s) for a noise path that is a signal having only noise points, using a time window filter or noise threshold value control for the channel estimation values transformed into the time domain to remove one or more noise path from a channel response;

a DFT (Discrete Fourier Transform) step that transforms the channel estimation values in the time domain, from which one or more noise paths are removed, into the frequency domain to obtain channel estimation values in the frequency domain; and an equalization filtering step that performs equalization of a received signal based on the channel estimation values in the frequency domain.

9. The equalizing method according to claim 8, wherein the copying step determines a number of the end-side subcarriers copied in accordance with a transmission path state.

10. A non-transitory computer-readable storage device storing a program causing a computer to execute:

performing channel estimation by signal processing in a frequency domain using a single carrier pilot signal;

copying one or a plurality of channel estimation values of end-side subcarriers in the frequency domain before transforming the channel estimation values in the frequency domain into a time domain, wherein the copying step copies said one or a plurality of channel estimation values of the end-side subcarriers at locations of subcarriers of low frequency components and/or high frequency components outside a bandwidth of the received signal;

transforming the channel estimation values in the frequency domain obtained by the copying step into the time domain;

substituting zeros (0s) for a noise path that is a signal having only noise points, using a time window filter or noise threshold value control for the channel estimation values transformed into the time domain to remove one or more noise path from a channel response; and transforming the channel estimation values in the time domain, from which one or more noise paths are removed, into the frequency domain to obtain channel estimation values in the frequency domain.

11. The device according to claim 10, wherein the copying step determines a number of the end-side subcarriers to be copied in accordance with a transmission path state.

12. A non-transitory computer-readable storage device storing a program causing a computer to execute the steps of:

transforming a single carrier signal into a frequency domain signal and performing equalization by signal processing in the frequency domain, copying one or a plurality of channel estimation values of end-side subcarriers before transforming the channel estimation values in the frequency domain into a time domain, the copying step copying said one or a plurality of channel estimation values of the end-side subcarriers at locations of subcarriers of low frequency components and/or high frequency components outside a bandwidth of the received signal;

transforming the channel estimation values in the frequency domain obtained by the copying step into the time domain;

substituting zeros for a noise path that is a signal having only noise points, using a time window filter or noise threshold value control for the channel estimation values transformed into the time domain to remove one or more noise path from a channel response;

transforming the channel estimation values in the time domain, from which one or more noise paths are removed, into the frequency domain to obtain channel estimation values in the frequency domain; and an equalization filtering step that performs equalization of a received signal based on the channel estimation values in the frequency domain.

13. The device according to claim 12, wherein the copying step determines a number of the end-side subcarriers copied in accordance with a transmission path state.

14. A channel estimation apparatus which performs channel estimation by signal processing in a frequency domain using a single carrier pilot signal, the apparatus comprising
a first DFT (Discrete Fourier Transform) unit that receives the pilot received signal to transform the signal into the frequency domain;
a subcarrier demapping unit that selects one or more desired subcarriers;
a correlation processing unit that performs channel estimation by processing a correlation of an output of the subcarrier demapping unit and a pilot reference signal generated on transferring a pilot symbol into the frequency domain;
a subcarrier copying unit that copies K items of end-side subcarriers at locations of subcarriers of low frequency components and/or high frequency components outside the bandwidth of the received signal, using the channel estimation obtained in the correlation processing unit and a subcarrier copy number K, where K is an integer greater than or equal to zero (0);
a first IDFT (Inverse Discrete Fourier Transform) unit that transforms the channel estimation obtained by the subcarrier copying unit into a time domain channel response;
a noise path removing unit that substitutes zeros (0s) for a noise path that is a signal having only noise points from the channel response, using a time window filter or noise threshold value control to remove one or more noise paths from the channel response; and
a second DFT unit that transforms the channel response, from which noise paths are removed by the noise path removing unit, into the frequency domain, and that outputs a noise-suppressed channel estimation value.

15. The channel estimation apparatus according to claim 14, wherein the noise path removing unit removes one or more noise paths from the channel response using one or both of a time window filter and noise threshold value control.

16. An equalizing apparatus which transforms a single carrier signal into a frequency domain signal and performs equalization by signal processing in the frequency domain, the apparatus comprising:
a first DFT (Discrete Fourier Transform) unit that receives the single carrier pilot signal to transform the signal into the frequency domain;
a subcarrier demapping unit that selects one or more desired subcarriers;
a correlation processing unit that performs channel estimation by processing of correlation of an output of the subcarrier demapping unit and a pilot reference signal generated on transferring a pilot symbol into the frequency domain;
a subcarrier copying unit that copies K items of end-side subcarriers at locations of subcarriers of low frequency components and/or high frequency components outside the bandwidth of the received signal, using channel estimation obtained in the correlation processing unit and a subcarrier copy number K, where K is an integer greater than or equal to zero (0);
a first IDFT (Inverse Discrete Fourier Transform) unit that transforms channel estimation obtained by the subcarrier copying unit into time domain channel response;
a noise path removing unit that substitutes zeros (0s) for a noise path that is a signal having only noise points from the channel response, using a time window filter or noise threshold value control to remove one or more noise paths from the channel response;
a second DFT unit that transforms the channel response, from which noise paths are removed by the noise path removing unit, to the frequency domain, and that output a noise-suppressed channel estimation value;
a weight calculation unit that calculates equalizing weights from the noise-suppressed channel estimation obtained by the second DFT unit;
an equalization filter for equalizing a received signal in the time domain by the equalizing weights; and
a second IDFT unit that transforms the equalized signal into the frequency domain to output a resulting demodulated signal.

17. The equalizing apparatus according to claim 16, wherein the noise path removing unit removes noise paths from the channel response using one or both of a time window filter and noise threshold value control.

18. The equalizing apparatus according to claim 16, wherein the weight calculation unit calculates the equalizing weight based on a MMSE (Minimum Mean Square Error) method or on a ZF (Zero-Forcing) method.

19. A channel estimation apparatus which performs channel estimation by signal processing in the frequency domain using a single carrier pilot signal, the apparatus comprising:
a first DFT unit that receives a pilot received signal to transform the signal into the frequency domain;
a subcarrier demapping unit that selects one or more desired subcarriers;
a correlation processing unit that performs channel estimation by processing a correlation of an output of the subcarrier demapping unit and a pilot reference signal generated on transferring a pilot symbol into the frequency domain;
a third IDFT unit that transforms the channel estimation obtained by the correlation processing unit into time domain channel response;
a transmission path calculation unit that calculates a coherent bandwidth from the channel response;
a subcarrier copying unit that determines a number for copying in accordance with a transmission path state, using the channel estimation obtained by the correlation processing unit, the coherent bandwidth calculated by the transmission path calculation unit and K which is a subcarrier copy number; the subcarrier copying unit copying the number of end-side subcarriers determined;
a first IDFT unit that transforms the channel estimation obtained by the subcarrier copying unit into the time domain channel response;
a noise path removing unit that removes one or more noise paths from the channel response; and
a second DFT unit that transforms the channel response, from which noise paths are removed by the noise path removing unit, into the frequency domain to output a noise-suppressed channel estimation value.

20. An equalizing apparatus which transforms a single carrier signal into a frequency domain signal and performs equalization by signal processing in the frequency domain, the apparatus comprising:
- a first DFT unit that receives a single carrier pilot signal to transform the signal into the frequency domain;
- a subcarrier demapping unit that selects one or more desired subcarriers; a correlation processing unit that performs channel estimation by processing a correlation of an output of the subcarrier demapping unit and a pilot reference signal generated on transforming a pilot symbol into a frequency domain signal;
- a third IDFT unit that transforms the channel estimation obtained by the correlation processing unit into a time domain channel response;
- a transmission path calculation unit that calculates a coherent bandwidth from the channel response;
- a subcarrier copying unit that determines a number for copying in accordance with a transmission path state, using channel estimation obtained by the correlation processing unit, the coherent bandwidth calculated by the transmission path calculation unit and K which is a subcarrier copy number; the subcarrier copying unit copying the number of end-side subcarriers determined;
- a first IDFT unit that transforms the channel estimation obtained by the subcarrier copying unit into time domain channel response;
- a noise path removing unit that removes one or more noise paths from the channel response;
- a second DFT unit that transforms the channel response, from which noise paths are removed by the noise path removing unit, to the frequency domain to output a noise-suppressed channel estimation value;
- a weight calculation unit that calculates an equalizing weight from the noise-suppressed channel estimation obtained by the second DFT unit;
- an equalization filter that equalizes a received signal in the frequency domain by the equalizing weight; and
- a second IDFT unit that transforms the equalized signal to the time domain and that output a resulting demodulated signal.

21. A channel estimation method for performing channel estimation by signal processing in a frequency domain using a single carrier pilot signal, the method comprising:
- receiving a pilot received signal and transforming the pilot received signal to the frequency domain;
- selecting one or more desired subcarriers;
- performing channel estimation by correlation processing of selected subcarriers and a pilot reference signal obtained on transferring a pilot symbol into the frequency domain;
- using the channel estimation and K which is a subcarrier copy number, copying K items of end-side subcarriers at locations of subcarriers of low frequency components and/or high frequency components outside the bandwidth of the received signal;
- transforming resulting channel estimation into time domain channel response;
- substituting zeros (0s) for a noise path that is a signal having only noise points from the channel response, using a time window filter or noise threshold value control to remove one or more noise-paths from the channel response;
- transforming the channel response, from which noise paths are removed, is into the frequency domain; and
- outputting a noise-suppressed channel estimation value.

22. An equalizing method for transforming a single carrier signal into a frequency domain signal and performing equalization by signal processing in the frequency domain, the method comprising:
- receiving a pilot received signal and transforming the pilot received signal to the frequency domain;
- selecting one or more desired subcarriers;
- performing channel estimation by correlation processing of selected subcarriers and a pilot reference signal obtained on transferring a pilot symbol into the frequency domain;
- using the channel estimation and K which is a subcarrier copy number, copying K items of end-side subcarriers at locations of subcarriers of low frequency components and/or high frequency components outside the bandwidth of the received signal;
- transforming resulting channel estimation into a time domain channel response;
- substituting zeros (0s) for a noise path that is a signal having only noise points from the channel response, using a time window filter or noise threshold value control to remove one or more noise-paths from the channel response; and
- transforming the channel response, from which noise paths are removed, is into the frequency domain;
- outputting a noise-suppressed channel estimation value;
- calculating an equalizing weight from noise-suppressed channel estimation;
- equalizing the received signal in the frequency domain with the equalizing weight; and
- transforming the equalized signal into a time domain and outputting a resulting demodulated signal.

23. A channel estimation method for performing channel estimation by signal processing in the frequency domain using a single carrier pilot signal, the method comprising:
- receiving a pilot received signal and transforming the pilot received signal to the frequency domain;
- selecting one or more desired subcarriers;
- performing channel estimation by correlation processing of a selected subcarriers and a pilot reference signal obtained on transferring a pilot symbol into the frequency domain;
- transforming the channel estimation into a first time domain channel response;
- calculating a coherent bandwidth from the first channel response;
- determining the number of subcarriers to be copied in accordance with a transmission path state, using the channel estimation, the coherent bandwidth and K which is a subcarrier copy number;
- copying the number determined of end-side subcarriers;
- transforming the resulting channel estimation into a second time domain channel response;
- removing one or more noise paths from the second channel response;
- transforming the second channel response, from which noise paths are removed into the frequency domain; and
- outputting a noise-suppressed channel estimation value.

24. An equalizing method for transforming a single carrier signal is transformed into a frequency domain signal and performing equalization by signal processing in the frequency domain, the method comprising:
- receiving a pilot received signal and transforming the pilot received signal to the frequency domain;
- selecting one or more desired subcarriers;

performing channel estimation by correlation processing of a selected subcarriers and a pilot reference signal obtained on transferring a pilot symbol into the frequency domain;

transforming the channel estimation into a first time domain channel response;

calculating a coherent bandwidth from the first channel response;

determining a number of subcarriers to be copied in accordance with a transmission path state, using the channel estimation, the coherent bandwidth and K which is a subcarrier copy number;

copying the number determined of end-side subcarriers;

transforming the resulting channel estimation into a second time domain channel response;

removing one or more noise paths from the second channel response;

transforming the second channel response, from which noise paths are removed into the frequency domain; and outputting a noise-suppressed channel estimation value;

calculating an equalizing weight from noise-suppressed channel estimation;

equalizing a received signal in the frequency domain with the equalizing weight; and transforming the equalized signal into the time domain and outputting a resulting demodulated signal.

* * * * *